United States Patent Office 3,477,962
Patented Nov. 11, 1969

3,477,962
PALLADIUM-LEAD CATALYSTS
Joseph A. Kardys, Groton, Conn., assignor to Chas. Pfizer & Co., Inc., New York, N.Y., a corporation of Delaware
No Drawing. Filed May 6, 1966, Ser. No. 547,740
Int. Cl. B01f 11/14, 11/12, 11/08
U.S. Cl. 252—412                                    8 Claims

ABSTRACT OF THE DISCLOSURE

An improvement is set forth in the process for the preparation of a lead-palladium hydrogenation catalyst having enhanced selectivity to catalyze the hydrogenation of an acetylenic bond to an olefinic bond only. The improvement comprises impregnating a support material with a palladium salt and a lead salt to provide an atomic ratio of lead to palladium of from about 1:1 to 5:1, and thereafter subjecting said impregnated support material to a reducing step to provide a catalyst containing metallic palladium. The thus produced catalyst can be renenerated by intimately mixing it with sodium bicarbonate-hydrogen peroxide in aqueous solution.

---

This invention relates to new palladium-lead catalyst for the selective hydrogenation of acetylenic to olefinic bonds, to processes for the production thereof and to a process for the activation of poorly active palladium-lead catalysts.

Various deactivated palladium catalysts for the selective hydrogenation of acetylenic to ethylenic bonds are known. Lindlar, in U.S. Patent 2,681,938, issued June 22, 1954, discloses and claims a palladium-lead catalyst produced by heating an aqueous solution of a lead salt with a slurry of reduced palladium metal catalyst until lead has been deposited upon the palladium. The use of bismuth salts and mixtures of bismuth and lead salts in place of lead salts is also disclosed by Lindlar. The deactivation of paladium catalysts with various other metal salts such as zinc, mercury, cadmium, thorium and, more recently, tin salts (U.S. 3,192,168, issued June 29, 1965) has also been described.

It has now been found that a deactivated palladium catalyst capable of improved yields and greater selectivity in the hydrogenation of acetylenic to olefinic bonds than the heretofore described deactivated palladium catalysts is obtained when a palladium salt on a suitable support material, e.g. barium carbonate, calcium carbonate, active charcoal, carbon black, magnesium oxide, calcium sulfate, clay or the like, is impregnated with an aqueous solution of a lead salt and the raw catalyst thus obtained reduced to provide metallic palladium. The reduced catalyst is recovered, washed and dried below 56° C. Suitable palladium salts are palladium sulfate, palladium choride, palladous potassium chloride and potassium nitrate. Of these, palladium chloride is preferred. Suitable lead salts are the acetate, chloride, citrate and nitrate. Of these, lead acetate is preferred. The atomic ratio of lead to palladium in the catalyst is preferably not less than 1 to 1 and can be as high as 5 to 1. The favored support material is calcium carbonate.

The initial steps of impregnating a support material with a palladium salt and a lead salt are conducted at a temperature of from about 0° C. to about 90° C. and desirably at about room temperature. The ratio of support material ot palladium salt or lead salt is not critical but can vary widely. A convenient ratio of support material to palladium is about 20 to 1.

The order in which the palladium salt and lead salt are applied to the support material is of no consequence. Either of the salts may be applied first followed by application of the other. The total amount of lead salt can be appied to the support material in the first stage of the process or portions of the lead salt can be applied to the support material at different stages of the process. For example, a portion, e.g. half, of the lead salt can be applied to the support material immediately before or after application of the palladium salt. The remaining portion of the lead salt can then be appied to the palladium salt and lead salt containing support material after the treatment of the raw catalyst with sodium bicarbonate-hydrogen peroxide.

The raw catalyst is reduced, preferably chemically, at a low temperature with formaldehyde or hydrazine in the presence of a weak water soluble base such as sodium bicarbonate. The sodium bicarbonate-formaldehyde reducing system. Other reducing agents such as sodium borohydride, ascorbic acid, isoascorbic acid, cerelose and reducing sugars in general can be used in place of formaldehyde or hydrazine but are much slower in their action. The sodium bicarbonate can, of course, be replaced by other alkali metal bicarbonates such as potassium or lithium bicarbonates but is favored for economic reasons. The reduction is carried out at a temperature of from about 0° C. to about 50° C. and most desirably at a temperature of from 10° C. to 25° C. The preferred temperature is from 18° C. to 22° C.

The amount of reducing agent, e.g. formaldehyde, required for the reduction is desirably held to the minimum based on the stoichiometric amount required to produce metallic palladium. Quantities much in excess of this amount afford no advantages and are only wasted. The sodium bicarbonate is usually, but not necessarily, used as a saturated solution. The amount used is not critical but experience has shown quantities of from about 10 g. to about 100 g. of sodium bicarbonate (solid) per 100 ml. of 5% palladium chloride consistently produce catalysts of high activity.

The raw catalyst prepared as described above can also be reduced with hydrogen. In this modification of the present invention the dry raw catalyst is charged into a hydrogenation vessel, the vessel purged with nitrogen, and a weak, solvent soluble organic base, that is, an organic base having a $pK_a$ value of from about 4.0 to about 5.8, and a reaction inert solvent such as hexane or petroleum ether added. Representative weak organic bases which can be used are aniline, o-anisidine, p-anisidine, N,N,dimethylaniline, N,N-dimethyl-o-toluidine, N-methylaniline, $\beta$-naphthylamine, quinoline, o-toluidine and 1,2-dihydro-2,2,4-trimethyl-6-ethoxyquinoline. The vessel is then purged with hydrogen and then hydrogenated at a temperature of from about 15° C. to about 50° C. and a low pressure, e.g. up to about 50 p.s.i., until the catalyst turns black. Normal temperature and pressure are preferred. The catalyst, if desired, is separated from the solvent by conventional methods and dried. However, when using this modification it is not necessary to isolate the reduced catalyst. The entire mixture containing the reduced catalyst can be used directly to reduce an acetylenic to an olefinic bond, as, for example, in the reduction of oxenin to hydroxenin as is illustrated herein.

In a preferred modification of this process the slurry of supported palladium and lead salts is stirred with a weak base, such as sodium, potassium or lithium bicarbonate at levels of from about 10% to about 30% by weight of the support material. The mixture is heated and hydrogen peroxide added at a level of from about 3% to about 5% by weight of the support material. The hydrogen peroxide treatment appears to produce a more uniform catalyst. The mixture is then cooled and filtered, the raw catalyst washed free of salts then reslurried in water and reduced as described above. The point in the process at which this sodium bicarbonate-hydrogen peroxide is applied is not critical. It can, for example, be applied prior to reduction as noted above or after reduction. Illustrations of this treatment are provided herein.

In a further modification of the process of this invention an alkaline solution of palladium chloride is added to a suspension of calcium carbonate or other support material, the resulting palladium salt impregnated support material then contacted with an aqueous solution of a lead salt and the mixture then processed in the manner described above. The catalyst produced by this method using an alkaline palladium salt solution is, however, sometimes colloidal in nature and difficult to separate from the aqueous phase for this reason.

The reduced catalyst is dried at a temperature of less than 56° C. in order to avoid deactivation of the catalyst. Air drying and vacuum drying are convenient methods to use.

If, as may sometimes unexplainably happen, the catalyst thus prepared is of reduced activity as determined, for example, by the rate at which it reduces oxenin to hydroxenin on a laboratory scale, its activity can be restored by treating said catalyst with sodium bicarbonate-hydrogen peroxide in aqueous solution. This treatment in effect regenerates the activity of the catalyst. Experience has shown that proportions of sodium bicarbonate (or other alkali metal bicarbonate, e.g. lithium or potassium) of from about 5% to about 20% by weight of catalyst and from about 1% to about 10% of hydrogen peroxide by weight of catalyst are effective in reactivating the catalyst. The hydrogen peroxide is usually used as the 3% solution, from about 35 to about 300 ml. being used. The catalyst of reduced activity is merely mixed with the sodium bicarbonate and hydrogen peroxide in aqueous solution for a brief period, e.g. from 10–60 minutes at a temperature of from about 5° C. to about 90° C., then filtered, washed and dried.

The following examples are provided to illustrate in greater detail the manner of practicing the present invention. They are, however, not to be considered as limiting the scope thereof in any way. The percentage values referred to are on a by-weight basis.

Example I

To a suspension of calcium carbonate (100 g.) in water (1 liter) at 50° C. there is slowly added palladium chloride (100 ml. of a 5% solution saturated with lead chloride). The mixture is stirred for 15 minutes, then lead acetate (100 ml. of a 10% solution) is added and the mixture stirred an additional 30 minutes. Sodium bicarbonate (20 g.) is added and the stirred mixture heated to 90° C. for 30 minutes. Hydrogen peroxide (100 ml. of a 3% solution) is then added below the surface, the mixture stirred for 30 minutes, then cooled to 50°–60° C. and filtered. The cake is washed with water, then reslurried in water (1 liter) at 25°–35° C. Sodium bicarbonate (10 g.) and formaldehyde (10 ml. of 37% solution) are added and the slurry stirred until reduction is complete (20 minutes). The reduced catalyst is filtered off, the cake washed with water (1 liter), then air-dried below 56° C.

The catalyst thus obtained has an atomic ratio of lead-to-palladium of 1 to 1.

Example II

The procedure of Example I is repeated but using hydrazine hydrate (0.25 ml. of 64% in 50 ml. water) as the reducing agent in place of formaldehyde at room temperature for 55 minutes.

Repetition of this procedure but using 0.1 ml. and 1 ml. of hydrazine hydrate rather than 0.25 ml. produces substantially the same result.

Example III

Calcium carbonate (200 g.) is suspended in water (1800 ml.) and palladium chloride (200 ml. of a 5% solution) added over a ten-minute period with stirring. Following an additional ten minutes of stirring, potassium carbonate (20 g.) is added and the mixture heated at 80° C. for 20 minutes then cooled to 50°–60° C. and filtered. The filter cake is washed with water (1 liter) then reslurried in water (1800 ml.) containing potassium carbonate (20 g.) at 70°–80° C. for one hour. The slurry is filtered, washed with water (1 liter) and again reslurried in water (2 liters).

Lead acetate (200 ml. of a 10% solution) is added to the slurry which is heated at 60°–70° C. for one hour then filtered. The cake is washed free of chloride and divided into two equal parts.

One half of the wet filter cake (155 g.) is slurried in water (1800 ml.) and reduced with sodium bicarbonate (20 g.)-formaldehyde (25 ml. of 37% solution) at 55° C. Reduction is complete in less than 30 minutes. The catalyst is filtered, washed with water and air-dried below 56° C.

Example IV

The second half of the wet filter cake (155 g.) of Example III is suspended and stirred in water (1800 ml.). Sodium bicarbonate (20 g.) and sodium borohydride (4 g.) are added and the mixture thoroughly stirred at room temperature. After 15 minutes the catalyst is recovered by filtration, washed with water (1 liter) and air-dried at a temperature below 56° C.

The activity of this catalyst is equivalent to that of the catalyst of Example III.

Example V

Calcium carbonate (21 kg.) is slurried in water (300 liters) and palladium chloride (18 liters of 5% solution) added over a 5-minute period. The suspension is stirred and heated at 60° C. for 30 minutes then cooled to 45°–50° C. Lead acetate (16.2 liters of 10% solution) is added and the mixture stirred for 30 minutes at 50° C. The solid is allowed to settle, the water decanted off and the solid washed by repeated slurrying in water and decantation and finally filtered. The filter cake is reslurried in water (150 liters), sodium bicarbonate (4200 g.) added and the mixture stirred for 10 minutes. Formaldehyde (4.2 liters of 37% solution) is added and the mixture stirred at room temperature until the catalyst turns black. The reduced catalyst is removed by filtration, washed thoroughly to remove chloride, then added to water (2 liters) containing sodium bicarbonate (2100 g.). To this slurry of reduced catalyst is added hydrogen peroxide (20 liters of 4.5% solution) and the slurry stirred for 10 minutes at room temperature. The catalyst is then recovered by filtration, washed with water (150 liters) and air-dried below 56° C.

Example VI

Palladium chloride (6 liters of 5% solution) is added to water (150 liters) containing sodium bicarbonate (700 g.). The mixture is stirred for 10 minutes after which calcium carbonate (7 kg.) is added. The mixture is stirred for one hour during which the temperature is gradually raised to 40°–45° C. The slurry is filtered and the filter cake washed with water and pressed as dry as possible. The wet cake is reslurried in water (150 liters), potassium carbonate (700 g.) added, the slurry stirred and slowly brought to a temperature of about 45° C. over a one-hour period. The palladium chloride impregnated support material is removed by filtration, washed with water (150 liters) and reslurried in water (150 liters). Lead acetate (5.6 liters of 10% solution) is added slowly to the slurry and the mixture brought up to a temperature of 45°–50° C. over a one-hour period. Sodium bicarbonate (1.4 kg.) is added followed by formaldehyde (1.4 liters of 37% solution) and the mixture stirred at 40°–45° C. until reduction is complete as evidenced by the black appearance of the catalyst. The reduced catalyst is filtered off, washed thoroughly with water, reslurried in water (150 liters) and to the slurry sodium bicarbonate (700 g.) and hydrogen peroxide (10 liters of 3% solution) are added. The mixture is stirred at room temperature for 30 minutes then filtered and the cake washed thoroughly with water. The catalyst is vacuum dried below 56° C.

Example VII

The procedure of Example I is repeated but using 200 ml. of a 10% lead acetate solution to produce a catalyst having a lead to palladium ratio of 2 to 1. The catalyst is essentially equivalent in activity to the catalyst of Example I. Similarly a catalyst having a lead to palladium ratio of 5 to 1 (prepared using 500 ml. of a 10% lead acetate solution) is comparable to the activity of the catalyst of Example I.

EXAMPLE VIII

Calcium carbonate (200 g.) is slurried in water (1.8 liters) and lead acetate (200 ml. of 10% solution) added. After stirring for 30 minutes palladium chloride (200 ml. of 5% solution) is added and the mixture heated at 50° C. for 30 minutes. Sodium bicarbonate (20 g.) is added and the mixture heated at 80°–90° C. for 30 minutes. It is then cooled at 55° C., filtered and washed with water to remove the chloride, and dried.

A 2 g. portion of the dry raw catalyst is charged into a hydrogen flask and the flask purged with nitrogen. Quinoline (1 ml.) and hexane (150 ml.) are added and the raw catalyst hydrogenated until completely black; oxenin (50 g.) is added and reduction continued until a hydrogen uptake of approximately 105% is reached. The flask is removed from the shaker and gently warmed under an atmosphere of nitrogen to dissolve the crystalline product present. The hexane solution is filtered to remove the catalyst, the filter cake washed with hexane (50 ml.) and the combined filtrate and washings chilled at −20° C. overnight. The crystalline hydroxenin is removed by filtration, washed with cold hexane and dried: yield 90%.

Repetition of this procedure by using aniline, N,N-dimethyl-o-toluidine, m-anisidine and 1,2-dihydro-2,2,4-trimethyl-6-ethoxyquinoline in place of quinoline produces substantially the same result.

EXAMPLE IX

The procedure of Example I is repeated but using the following palladium and lead salts in amounts equivalent to the palladium and lead salts of Example I, and 100 g. quantities of the following support materials.

| Support Material | Palladium Salt | Lead Salt |
|---|---|---|
| Calcium sulfate | Palladium chloride | Lead acetate. |
| Do | Palladium nitrate | Lead chloride. |
| Calcium carbonate | Palladium chloride | Do. |
| Do | Palladium sulfate | Lead citrate. |
| Magnesium oxide | Palladium chloride | Lead acetate. |

EXAMPLE X

To a suspension of oxenin (50 g., 3,7-dimethyl-9-(2,6,6-trimethyl - 1 - cyclohexen-1-yl)nona-2,7-diene-4-yne-1,6-diol) in petroleum ether (100 ml.) is added quinoline (1 ml.) and 5 g. of the catalyst of Example I. The mixture is hydrogenated at 20° C. and atmospheric pressure until 105% of the hydrogen theoretically required to reduce the acetylenic bond to an olefinic is taken up. The reaction flask is heated under an atmosphere of nitrogen to dissolve the organic material present then filtered. The filter cake is washed with warm petroleum ether and the combined filtrate and washings chilled at −15° C. overnight. The product hydroxenin, (3,7-dimethyl-9-(2,6,6-trimethyl-1 - cyclohexen - 1-yl)nona-2,4,7-triene-1,6-diol) is filtered off, washed with petroleum ether then dried: yield 89%.

Repetition of this procedure but using the catalysts of Example VII in place of that of Example I produced yields of hydroxenin of 89% in each case.

Repetition of this procedure but using a catalyst prepared according to Example 1 of U.S. Patent 2,681,938 produced hydroxenin in 75% yield. Other Lindlar type catalysts prepared in similar fashion and containing percentages of lead-palladium of 5—5; 7.5–5 and 10–5 produced hydroxenin in yields of 85%, 79% and 74%, respectively.

EXAMPLE XI 100 g. of a catalyst produced according to the procedure of Example I and found to reduce oxenin at a very poor rate in laboratory tests was slurried in water (500 ml.). Sodium bicarbonate (10 g.) was added at room temperature followed by hydrogen peroxide (100 ml. of 3% solution). The slurry was stirred for 10 minutes, then filtered, washed with water and air dried.

The thus activated catalyst when used to reduce oxenin according to the procedure of Example X produced an 89% yield of hydroxenin.

EXAMPLE XII

The procedure of Example I is repeated but using equivalent amounts of the following reducing agents in place of formaldehyde: sodium borohydride, ascorbic acid, cerelose. The catalysts produced are of substantially the same activity as the catalyst of Example I. The time required for reduction is, however, considerably longer than that required when using formaldehyde as reducing agent.

What is claimed is:

1. In the process for the preparation of a lead-palladium hydrogenation catalyst having enhanced selectivity to catalyze the hydrogenation of an acetylenic bond to an olefinic bond only, the improvement which comprises impregnating a support material with a palladium salt and a lead salt to provide an atomic ratio of lead to palladium of from about 1:1 to 5:1, and thereafter subjecting said impregnated support material to a reducing step to provide a catalyst containing metallic palladium.

2. The process of claim 1 wherein the palladium salt is reduced by means of a reducing agent selected from the group consisting of, (a) formaldehyde or hydrazine in the presence of an aqueous solution of a weak water soluble base, and (b) hydrogen in a reaction inert organic solvent in the presence of a weak organic base soluble in said organic solvent.

3. The process of claim 2 wherein the support material impregnated with a palladium salt and a lead salt is intimately mixed with sodium bicarbonate-hydrogen peroxide, in the proportions of about 10% to 30% of the bicarbonate and about 3% to 5% of the peroxide by weight of the support material, prior to reducing the palladium salt to metallic palladium.

4. The process of claim 2 wherein the support material impregnated with a palladium salt and a lead salt is intimately mixed with sodium bicarbonate-hydrogen peroxide, in the proportions of about 10% to 30% of the bicarbonate and about 3% to 5% of the peroxide by weight of the support material, after reduction of the palladium salt to metallic palladium.

5. The process of claim 2 wherein the support material is calcium carbonate, the palladium salt is palladium chloride, the lead salt is lead acetate and the reducing agent is formaldehyde.

6. The proces of claim 2 wherein the support material is calcium carbonate, the palladium salt is palladium chloride, the lead salt is lead acetate and the reducing agent is hydrogen in hexane in the presence of a weak organic base having a $pK_a$ value of from about 4.0 to about 5.8.

7. A lead-palladium hydrogenation catalyst produced by the process of claim 2.

8. A process for regenerating a lead-palladium catalyst of low activity prepared by the process of claim 2, which comprises intimately mixing said catalyst with sodium bicarbonate-hydrogen peroxide in aqueous solution in the proportions of about 5% to 20% of the bicarbonate and about 1% to 10% of the peroxide by weight of the catalyst.

References Cited

UNITED STATES PATENTS

| | | | |
|---|---|---|---|
| 2,857,337 | 10/1958 | Hamilton | 252—472 |
| 2,967,200 | 1/1961 | Foster | 260—566 |
| 2,836,613 | 3/1958 | Heininger | 260—465.6 |
| 2,681,938 | 6/1954 | Lindlar | 260—611 |
| 3,380,934 | 4/1968 | Batzold | 252—472 XR |
| 3,425,792 | 2/1969 | Stephens | 252—460 XR |

PATRICK P. GARVIN, Primary Examiner

U.S. Cl. X.R.

252—472, 473, 474, 440, 443, 447, 460; 260—617, 690